United States Patent [19]

Strulik et al.

[11] 3,981,317

[45] Sept. 21, 1976

[54] FLAME-ARRESTING OR SMOKE-CLEARING VALVE DEVICE OPERATING BY CLOSURE AND OPENING RESPECTIVELY

[76] Inventors: Wilhelm Paul Strulik, 2, rue d'Heurtebise, Roussemeau-Villeneuve-sur-Yonne, (Yonne); Claude Mealares, 40, rue Jean Baffier, Saint-Florent-sur-Cher, (Cher), both of France

[22] Filed: Feb. 3, 1975

[21] Appl. No.: 546,829

[30] Foreign Application Priority Data
Feb. 12, 1974 France .............................. 74.04607

[52] U.S. Cl. ........................................ 137/75; 98/1; 137/72; 137/360; 137/554
[51] Int. Cl.² ........................................ F16K 17/38
[58] Field of Search ........................ 137/72–77, 137/543.15; 126/287.5; 98/86, 1; 220/89 B

[56] References Cited
UNITED STATES PATENTS

| | | | |
|---|---|---|---|
| 969,554 | 9/1910 | McVeety | 98/86 |
| 1,022,119 | 4/1912 | Barton | 137/75 |
| 3,495,606 | 2/1970 | Phillips | 98/86 X |
| 3,809,108 | 5/1974 | Hughes | 137/73 |

Primary Examiner—Martin P. Schwadron
Assistant Examiner—Richard Gerard
Attorney, Agent, or Firm—McGlew and Tuttle

[57] ABSTRACT

The valve device adjustably controls air flow through a mechanical ventilation duct, blocks propagation of flames through the duct, and selectively exhausts smoke through the duct. An air extraction terminal sleeve communicates with the ventilation duct and is provided with an outwardly facing valve seat. A support is mounted in the sleeve inwardly of the valve seat and an elongated guide extends adjustably through the support. An obturator is mounted on the guide outwardly of the support for adjustably controlling the flow area into the terminal sleeve, and includes an outwardly convex dome member fixedly secured to the outer end of the guide, and an inwardly convex valve member having conforming seating engagement with the dome member and arranged to conformingly engage the valve seat to block flow into the terminal sleeve. The valve member is slidable on the guide, and a pair of oppositely wound coil springs surround the guide within the obturator and bias the valve member to separate from the dome member to engage the valve seat. A pin engaged with the guide restrains separation of the dome and valve members and releases such restraint responsive to detection of a fire whereby the valve member is disengaged from the dome member to engage the valve seat to block the terminal sleeve. The interior surfaces of the dome and valve members are lined with insulating layers, and the valve member has apertures therein covered by the associated insulating layer. By removal of this insulating layer and disengagement of the pin, the valve member may be separated from the dome member so that smoke may be exhausted through the duct.

7 Claims, 7 Drawing Figures

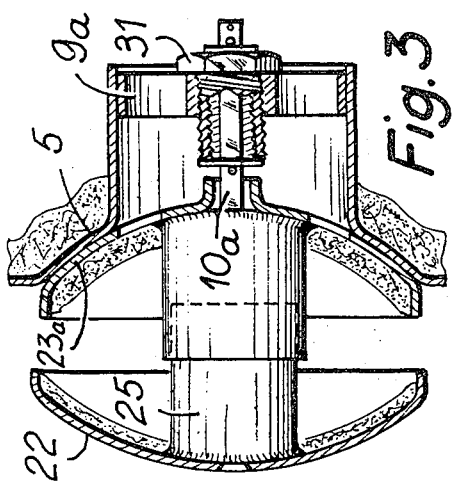

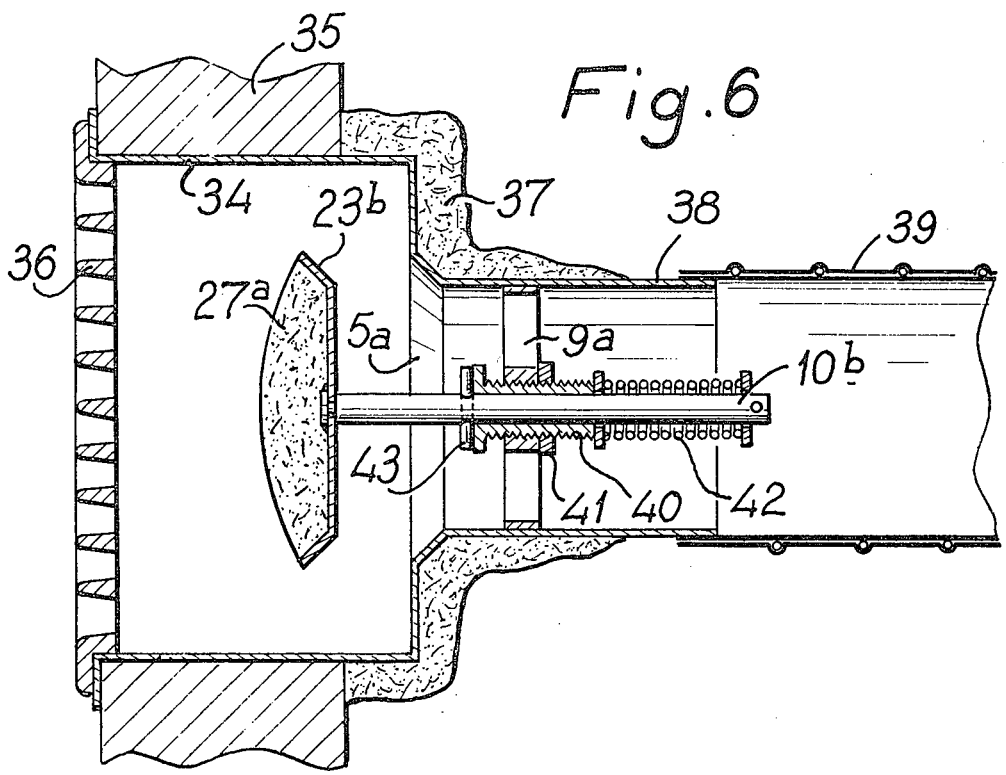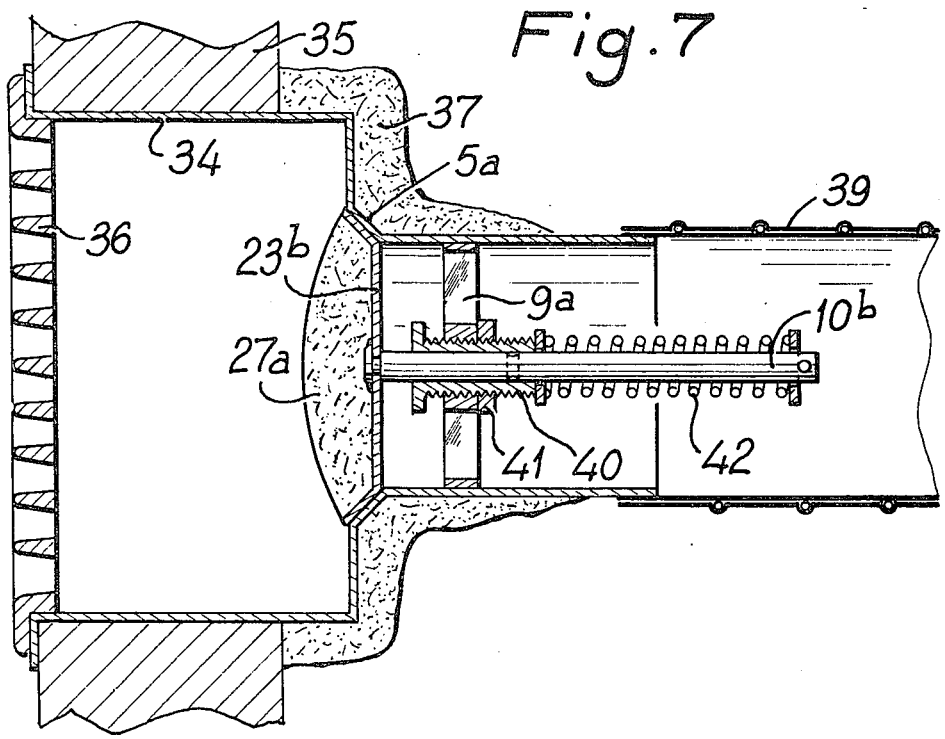

3,981,317

FLAME-ARRESTING OR SMOKE-CLEARING VALVE DEVICE OPERATING BY CLOSURE AND OPENING RESPECTIVELY

FIELD AND BACKGROUND OF THE INVENTION

The technical province of this invention concerns safety measures against fires in buildings.

The prior art has provided numerous devices in the form of duct-closing valves or trapdoors that operate in the event of an outbreak of fire in premises inside buildings having controlled mechanical ventilation, in which it is desired to avoid propagation of the flames through the ducts. Conversely, subsequent to a fire, it may be necessary to activate special ducts which are normally closed by valves or trapdoors, by opening the same in order to clear rooms, floors and corridors of smoke.

Prior art devices are complicated and costly and offer little facility for convenient adjustment of the throughput in the case of flame-arresters, nor sufficient versatility of the component parts to enable either flame-arresters, or smoke-clearing trapdoors or valves, to be devised.

SUMMARY OF THE INVENTION

The present invention has for its object to overcome these disadvantages and accordingly provides a valve device for closing or opening a smoke-clearing or controlled mechanical ventilation duct, characterized by the fact that it is held in position, against a countering spring set in compression, by a retractable or fusible key. When the key is retracted or otherwise released, a valve member of the valve device is biased by the countering spring to move into conforming engagement with the valve seat to block flow into the ventilation duct. The key is engaged in a stem portion of the valve device for cooperation with a bearing support for the stem, and the support has openings therethrough and is disposed in a terminal sleeve provided with an outwardly facing valve seat.

The invention thus provides an inexpensive, easy-to-install, simple and reliable safety system.

The description which follows of non-limitative exemplary embodiments of valves according to this invention, given with reference to the accompanying drawings, will give a clear understanding of how the invention can be carried into practice.

BRIEF DESCRIPTION OF THE DRAWINGS

In the drawings:

FIG. 1 is a diagrammatic sectional view of a flame-arrester valve;

FIGS. 2 and 3 correspondingly illustrate an alternative thereof in two different operating positions;

FIGS. 4 and 5 show likewise in section the alternative embodiment of FIGS. 2 and 3 used as a smoke extractor; and FIGS. 6 and 7 are sectional illustrations of another alternative embodiment, in two different operating positions, forming a valve for a box having a flame-arrester extraction mouth.

DESCRIPTION OF THE PREFERRED EMBODIMENTS

In buildings provided with controlled mechanical ventilation, a network of ducts is formed with a certain number of branch conduits terminating in air extraction mouths in the rooms. Obviously, as a precaution against an outbreak of fire in such a room, the mouth is provided with obturating means designed to prevent the flames from propagating through the ventilation network. Such sealing off is usually thermally initiated by fusible means which are effective also in closing an electric monitoring and alarm circuit.

In the embodiment shown in FIG. 1, the opening 1 in a flame-arresting partition or wall 2 is provided with a shroud 3 which may be fixed by nails 4 and which receives a nozzle-forming mouth 5 fitted into the wall upon a seal 6. The rim of the mouth covering the seal 6 tapers inwardly up to a stub 7 which is covered and extended by a sleeve 8 welded thereto, which sleeve is externally fast with restraining means consisting of resilient blades 11 curving into shroud 3, and internally carries a support 9 for a rectangularly shaped axial guide 10 mounted slidably through support 9, support 9 being formed by a hub portion for receiving radial streamlined struts and a rim for securing the same by nailing or screwing to sleeve 8.

Axial guide 10 is hollow and immobilized in an adjusted position in the hub of support 9 by an inclined grub screw 12 which, as will be hereinafter explained, is accessible from the exterior, for adjustment, through the flared portion of mouth 5. The inner end of guide 10 receives a bearing 13 for a rod 14 having an electrically conducting head 15, and also carries a complementary contact 16. At its other end, rod 14 carries a reinforcement 17 for its guided sliding motion through guide 10 and withstanding the thrust of a spring 18 interposed between the bearing and the reinforcement.

A fuse-pin 19 extends through guide 10 and provides an abutment for reinforcement 17 whereby to keep conducting head 15 away from contact 16 by compressing spring 18.

Fixed to the outer end of guide 10 is a nut 20 which receives a securing screw 21 fast with a dome 22 which partly bars the opening in mouth fitting 5 and forming one part of an obturator. Engaging into the open inwardly turned rim of dome 22 is a likewise rimmed valve 23, forming a second obturator part, slidably mounted over guide 10 and bearing against fuse 19. Two countercoiled springs 24, 24a are arranged axially one inside the other and bias the dome away from the valve. These springs are surrounded by flame-arrester means 25. The dome is lined internally with an insulating layer 26, the valve is lined with a layer 27, and the dorsal portion inward of shroud 3 with a layer 28.

A rearward projection from shroud 3 receives a connecting duct 29. Flexible leads run up to the fixed and moving contacts 16 and 15, emerge through grommets after extending along one of the struts of support 9, and are connected to the monitoring and alarm circuits.

Destruction of fuse-pin 19 causes expansion of springs 24, 24a, and valve 23 to be driven inwardly onto the seat-forming mouth 5, simultaneously with relaxation of spring 18 which closes contacts 15 and 16. Flame-arresting obturation is then effectively achieved for a sufficient period of time and the alarm is sounded.

Resetting ready for duty is effected by removing dome 22 from guide 10, reinserting rod 14, fitting a new fuse-pin 19, replacing valve 23 and springs 24, 24a in position, and screwing the dome on.

The flow rate can be adjusted by resetting guide 10 in its support 9 and fixing it in position once more by means of grub screw 12, accessible through the gap separating shroud 1 from its open valve 23.

Thereby there is provided a simple, inexpensive and effective piece of apparatus.

This apparatus is susceptible of numerous alternative embodiments and, more specifically, of unification of parts for performing dual functions, to wit the function just described of a flame-arrester on a suction duct of a controlled mechanical ventilation system, and also the function of smoke discharging through special, normally-closed ducts.

As shown in FIGS. 2 through 5, the apparatus is formed by identical but dual-purpose component parts, and to this end it will suffice to provide, for the guiding of valve 23a, an externally threaded stem 30 slidable relative to guide 10a. If such guide is pinned, inside the hub of support 9a, to a hollowheaded nut 31 through which guide 10a extends with transverse clearance, then the guiding stem, cut to the desired length, is free to slide over guide 10a and the flame-arrester function is performed as hereinbefore described. If stem 30 is restrained (FIGS. 4, 5), it can be set to the required length through the internally and externally threaded nut 31 inserted into supporting hub 9a.

A removable pin 33 inserted into one of its locking holes then restrains the guide 10a relative to the support, the dome being thus held applied against the valve and the latter against its seat. If pin 33 is removed by a remote-controlled mechanism for example (or if it is fusible and is associated to a remotely activated electrical resistance), the dome 22 will be released and recede from the valve, the latter being held against its seat by springs 24, 24a within safeguard 25 and the guide terminating in an abutment 32.

Valve 23 is formed with openings 34 in its wall that are uncovered through at least partial removal of the facing insulation layer 27, whereby a smoke discharge outlet is opened up (FIG. 5).

Thus, with a given stock of parts on a worksite, it is possible to devise either a fire-arrestor valve or a smoke discharge valve, for use with associated but obviously distinct ducts.

In yet another alternative embodiment shown in FIGS. 6 and 7, the above-described arrangement can be further simplified. To that end it forms a flame-arrestor/extraction-vent box comprising a casing 34 inserted into a fire-arresting partition or wall 35, with a frontal covering grid 36. The inner end of the casing is surrounded by an external insulating layer 37 and extended by a sleeve 38 for connection to a discharge duct 39, the sleeve being at least partly covered by the insulating material 37. Sleeve 38 receives therein a supporting member 9a into the hub of which is screwed a bush 40, forming a bearing for guide 10b, and secured by a locknut 41. At its downstream end guide 10b is provided with arresting means consisting of a pinned washer against which thrusts a spring 42 interposed between it and a further washer applied against the facing end section of bush 40. Positioned in front of bush 40 is a fusible key 43 which holds guide 10b in an advanced position with spring 42 compressed whereby to maintain the valve in its open position (FIG. 6). A valve 23b having an external insulating covering 27a is fixed to the font end of guide 10b by a screw and is held away from its seat 5a formed by the connecting surface between one of the faces of casing 34 and the sleeve 38. When fusible key 43 melts, valve 23b moves from its open position (FIG. 6) to its closed position (FIG. 7) as spring 42 relaxes. Setting the valve in its open position once more is effected by exerting a pull on it, thereby compressing the spring 42, and then inserting a new fusible key 43.

It goes without saying that changes and substitutions may be made in the embodiments hereinbefore described without departing from the scope of the invention.

What we claim is:

1. A valve device for adjustably controlling air flow through a mechanical ventilation duct, blocking propagation of flames through the duct, and selectively exhausting smoke through the duct, said valve device comprising, in combination, an air extraction terminal sleeve communicable with the ventilation duct and provided with an outwardly facing valve seat; a support mounted in said sleeve inwardly of said valve seat; an elongated guide extending through said support and having an inner end and an outer end, said guide being adjustable longitudinally relative to said support; means maintaining said guide in a longitudinally adjusted position relative to said support; an obturator mounted on said guide outwardly of said support for adjustably controlling the flow area into said terminal sleeve, said obturator including an outwardly convex dome member fixedly secured to the outer end of said guide and an inwardly convex valve member having conforming seating engagement with said dome member and arranged to conformingly engage said valve seat to block flow into said terminal sleeve; said valve member being slidable on said guide; spring means surrounding said guide within said obturator and biasing said valve member to separate from said dome member to engage said valve seat; and a pin engaged with said guide and restraining separation of said dome and valve members, said pin releasing such restraint responsive to detection of a fire whereby said valve member is disengaged from said dome member to engage said valve seat to block said terminal sleeve.

2. A valve device, as claimed in claim 1, in which said pin comprises fusible key means engaged with said guide inwardly of said valve member to maintain said valve member engaged with the dome member and spaced from said valve seat.

3. A valve device as claimed in claim 1, in which said spring means comprises two oppositely coiled springs; a protective insulating envelope surrounding said oppositely coiled springs; and layers of insulating material covering the internal surfaces of said dome member and said valve member and the external surface of said valve seat.

4. A valve device as claimed in claim 1, including normally disengaged electrical contact means operatively associated with the inner end of said guide, and controlling an electrical monitoring circuit; said contact means being engaged to close the monitoring circuit responsive to said pin releasing such restraint responsive to detection of a fire.

5. A valve device as claimed in claim 4, in which said guide is a tubular guide; a rod slidably mounted in said tubular guide and having an outer end engaged with said pin; said electrical contact means comprising a first contact on the inner end of said rod, normally spaced from a second contact on the inner end of said guide; and spring means biasing said rod to engage said pin; whereby, upon said pin releasing such restraint, said rod moves outwardly in said guide to engage said first and second contacts.

6. A valve device as claimed in claim 1, in which said mechanical ventilation duct comprises a shroud engaged in a vent in a fire-arresting partition, and having an outwardly projecting rim on its outer end; said terminal sleeve having an outwardly projecting rim on the portion thereof constituting said valve seat; a seal interposed between said rims; said terminal sleeve including a stub section communicating with said ventilation duct; a second sleeve secured to said stub section; and means retaining said second sleeve in said shroud; said second sleeve mounting said support.

7. A valve device as claimed in claim 1, in which the guide is slidably mounted in its support and fixedly held therein, by an oblique grub-screw the head of which is accessible through the gap between the open valve member the valve seat.

* * * * *